Oct. 23, 1962  F. MUNZ  3,059,502
DEVICE FOR ADJUSTING THE ECCENTRICITY OF CRANK PINS
Filed Dec. 29, 1959
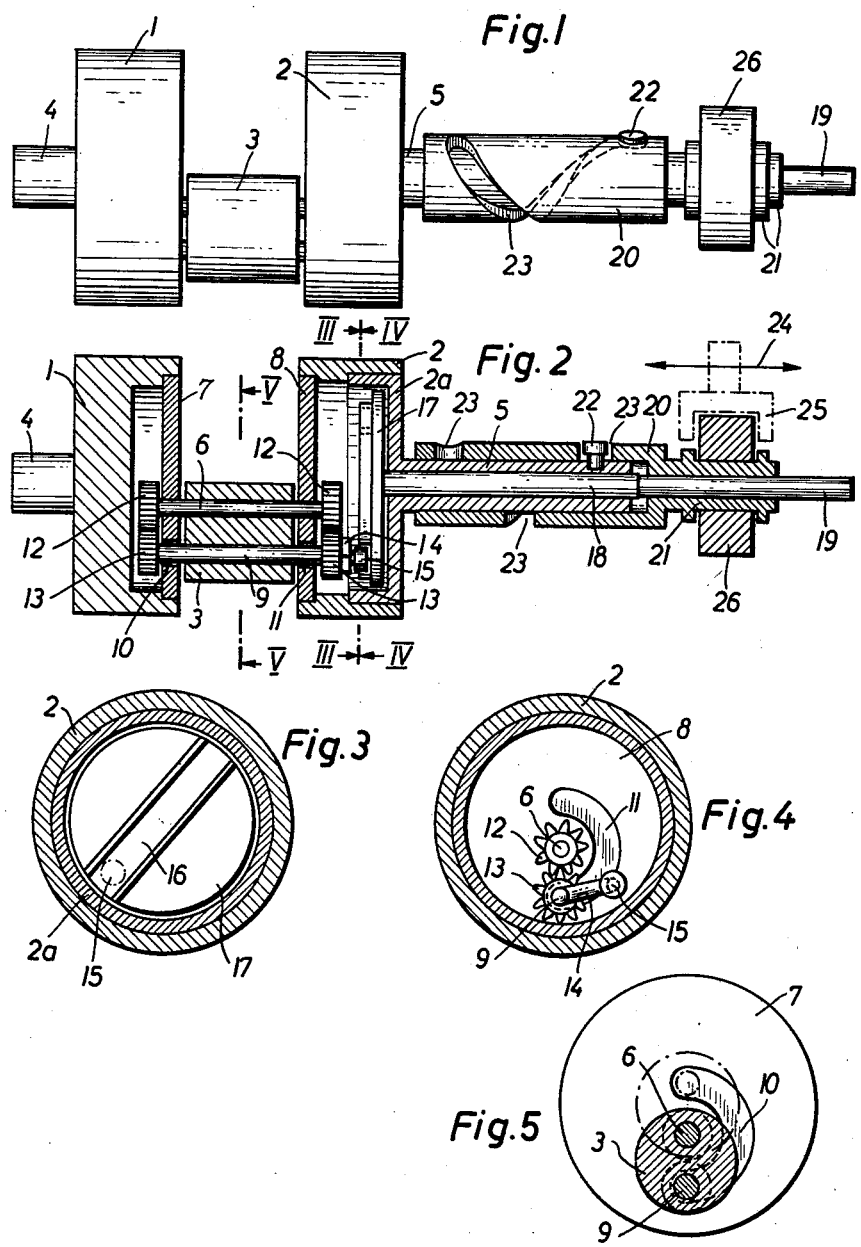
INVENTOR
Friedrich Munz
BY
Lowry & Rinehart
ATTYS.

United States Patent Office 3,059,502
Patented Oct. 23, 1962

3,059,502
DEVICE FOR ADJUSTING THE ECCENTRICITY OF CRANK PINS
Friedrich Munz, 18 Kolner Strasse, Bliesheim-Koln, Germany
Filed Dec. 29, 1959, Ser. No. 862,599
Claims priority, application Germany Dec. 30, 1958
6 Claims. (Cl. 74—600)

This invention relates to a device for adjusting the eccentricity of crank pins and the like and more particularly relates to a device permitting the adjustment of crank pins and the like while the crank is in rotation.

Crank shafts are generally provided with a predetermined and fixed eccentricity of the crank pin. Means for adjusting the distance between the crank pin and the axis of the crank shaft were already suggested. However, such adjustment can be effected only if the crank shaft is stopped. Adjustment of the crank pin while the crank shaft is rotating is impossible with this device.

It is the object of this invention to provide a device for adjusting the distance between the crank pin and the axis of the crank arm bearing the crank pin, this device permitting the adjustment and variation to be effected while the crank shaft is in rotation. The device of the invention is characterized in that the crank pin is eccentrically mounted on an axle which is arranged outside the axis of the crank arm and that the crank pin is also mounted on a second axle which is adjustable with respect to the first axle, the adjustment of said second axle being effected on a circular path about said first-mentioned axle which is rigidly secured to the crank arm. The second axle which will hereinafter be referred to as the adjusting axle is preferably guided by means of a lever arm in a groove which extends radially and may be provided in a disk mounted concentrically with respect to the crank shaft. Adjustment of the position of the crank pin is effected by turning the disk or a corresponding disk shaft. With this construction, it is made possible with simple means to vary the position of the crank pin of a crank shaft while the latter is rotating thereby giving the crank pin a more or less great eccentricity with respect to the axis of the crank shaft. The crank pin is mounted about a rigid axle and is capable of being swung along a circular path about the first-mentioned axle by means of a second axle thereby varying the eccentric position of the crank pin. The construction may be such that, in the one limiting position, the crank pin is located in the longitudinal axis of the crank shaft. In this case, the crank pin has no longer eccentricity with respect to the longitudinal axis. If a connecting rod is mounted on the crank pin, the former will no longer reciprocate. Maximum eccentricity is reached when the crank pin, by means of the second axle which is movable along a circular path, has been swung about the stationary axle to the outermost position, it being possible to give the crank pin an eccentric position which is closely approaching the periphery of the crank arm.

The stationary axle of the crank pin and the adjusting axle are provided at their ends with intermeshing gears. Thereby, the axles are rolled off on each other while the crank pin is adjusted along a circular groove. The gears and the disk which effects the adjustment of the crank pin may be housed in the hollow crank arm.

The mechanism effecting the adjustment of the crank pin while the crank shaft is rotating may be constructed in various manners. In one advantageous embodiment, the crank arm is provided with an extension in form of a bushing wherein the disk is mounted by means of a shaft. The shaft of this disk is preferably given a square cross section on a definite part of its length. Moreover, there may be provided a second bushing which is displaceable in axial direction, mounted on the square part of the shaft and telescopically receives the bushing of the disk shaft. The two bushings are engaging themselves such that if the one bushing is displaced in axial direction, the other bushing is imparted a rotary motion. This is preferably achieved by providing one of the bushings with a helical groove in which a boss secured to the other bushing is guided. Displacement of the one bushing in axial direction is preferably effected by means of a fork arm engaging this bushing by means of an annular flange or the like rigidly mounted on said bushing.

One embodiment of the device of the invention is illustrated in the accompanying drawings where FIG. 1 is a side view of the device of the invention, FIG. 2 is a longitudinal section of the device shown in FIG. 1, and FIGS. 3, 4, and 5 are sectional views along the lines III—III, IV—IV and V—V, respectively, of FIG. 2.

The crank shaft shown is composed of the crank arms 1 and 2, the crank pin 3, and the center shafts 4 and 5. To permit adjustment of the crank pin 3, the latter is pivotally mounted on the axle 6 which is rigidly mounted in the members 7 and 8 of the crank arms 1 and 2. The crank pin 3 is pierced to receive an additional axle 9 which is the adjusting axle guided in the grooves 10 and 11 extending in a circular path about the stationary axle 6. The two axles 6 and 9 are interconnected by gears 12 and 13. Secured to the adjusting axle 9 is a leg 14, at the end of which is mounted a roll 15. The end of the leg or the roll 15 is guided in a groove 16 provided on a disk 17 and extending radially.

As the disk 17 is rotated about its axis with respect to the crank arm 2, it positively takes the roll 15 or the leg 14 with it. The roll 15 is displaced in radial direction of the groove 16. Since the two axles 6 and 9 are intermeshing by the gears 12 and 13, any movement of the lever 14 causes the axle 9 to roll off about the axle 6 along the circular guide 11.

The relative rotation of the disk 17 with respect to the crank arm 2 likewise causes the crank pin 3 to be adjusted regarding its eccentricity with respect to the longitudinal axis of the crank shaft. This adjustment may be effected while the crank shaft is in rotation.

The adjustment may be effected as follows: The disk 17 is provided with a shaft 18 having a square end portion 19. The shaft 18 is pivotally mounted in the bushing 5 designed as the center shaft and integral with the member 2a which is a part of the crank arm 2. Surrounding the bushing 5 is a second bushing 20 which, with its extension 21, surrounds the square portion 19 of the shaft 18. Rigidly connected with the bushing 5 is a boss 22 which may also be designed as a roll. This roll 22 engages a helical groove 23 provided in the external bushing 20.

As the crank shaft rotates, the crank arm 2 with its extension, i.e. the bushing 5, and the bushing 20 with its extension 21 are interlocked in the direction of rotation due to the engagement of the square shaft section 19. The parts form an integral unitary member in the sense of rotation. If, however, the bushing 20, by means of an external force, is displaced in axial direction as indicated by the arrow 24, a relative rotation between the bushing 20 and the bushing 5 takes place due to the engagement of the boss 22 in the helical groove 23. This means that a relative rotation between the crank arm 2 and the disk 17 takes place, which rotation results in a change in the eccentric position of the crank pin 3. Thus, while the crank shaft as a composite unitary member, is rotating at full speed, adjustment of the eccentricity of the crank pin 3 can be easily effected by displacing the bushing 20, 21 on the square shaft portion 19 in longitudinal direction. This adjustment may be realized by means of a fork arm 25 which engages an annular flange 26 rigidly mounted on the member 21.

The adjusting device of the invention may be provided on crank pins arranged in overhung position. If the crank pin is arranged between two crank arms, each end of the axles 6 and 9 is provided with the intermeshing gears 12 and 13 for reasons of uniformity of motion. The device of the invention may be used for adjusting the length of strokes of apparatus connected to the crank pin and used for various purposes. Of great advantage is the adjustment of the stroke length by means of the device of the invention in case of a hydraulic piston drive (as disclosed, for example, in German Patent No. 1,036,599) which has provided at least three radially arranged cylinders acting on a common crank. Pistons connected to the crank pin are reciprocating in these cylinders. By means of the adjusting device of the invention, the length of strokes of the pistons in the hydraulic piston drive can be easily adjusted in operation.

It is also possible to design the crank arms 1 and 2 directly as gears for a transmission.

I claim as my invention:

1. A crankshaft comprising two spaced aligned center shafts having a common axis, spaced adjacent crank arms each secured to one of said center shafts and carrying a disk, a crank pin disposed between said disks, said crank pin having an axis, a first axle extending between and secured to said disks, said crank pin being journalled on said first axle in eccentric relation for the movement of the axis of said crank pin towards and away from the axis of said center shafts to vary the stroke of said crankshaft, arcuate slots in opposed faces of said disks centered about said crank pin axis, a second axle extending through said crank pin parallel to said first axle and having end portions seated in said slots, cooperating control means in part carried by one of said center shafts in a position to which access may be obtained during the rotation of the crankshaft and in part connected to said second axle for adjusting the position of said second axle and thus the position of said crank pin and the stroke of said crankshaft while said crankshaft is rotating and retaining said crank pin in an adjusted position.

2. The crankshaft of claim 1 wherein the crank arm secured to said center shaft carrying said control means is hollow and said center shaft carrying said control means is tubular and opens into said hollow crank arm, and said control means includes a control shaft extending through said tubular center shaft into said hollow crank arm, and means within said hollow crank arm connecting said control shaft to said second axle.

3. The crankshaft of claim 2 wherein said control means includes a bushing journalled on said tubular center shaft and secured to said control shaft, said bushing having a helical cam slot therein, a follower carried by said tubular center shaft seated within said cam slot whereby when said bushing is moved longitudinally said control shaft is rotated, and means for longitudinally shifting said bushing while said crankshaft is rotating.

4. The crankshaft of claim 2 wherein the means connecting said control shaft to said second axle includes a grooved plate, a leg secured to said second axle, and a follower on said leg seated in said plate groove.

5. The crankshaft of claim 1 wherein said crank arms are hollow; and said control means includes, a first gear secured to each end of said first axle within said crank arms, and second gears secured to opposite ends of said second axle and meshed with said first gears for uniformly rotating both ends of said second axle in response to turning one end of said second axle, and means for turning said one end of said second axle.

6. A crankshaft comprising first and second center shafts disposed in spaced aligned relation along a common axis, a hollow crank arm fixedly secured to each of said center shafts in opposed spaced relation and carrying opposed disks, a crank pin disposed between said disks, said crank pin having an axis, a first axle extending between and secured to said disks, said crank pin being journalled on said first axle in eccentric relation for movement of said crank pin axis towards and away from said center shafts axis to vary the stroke of the crankshaft, arcuate slots in said disks centered about said crank pin axis, a second axle extending through said crank pin parallel to said axle and having end portions seated in said slots, meshing gears on each end of said first and second axles within said crank disks for uniformly rotating both ends of said second axle in response to the turning of one end of said second axle to rotate said crank pin about said first axle, said first center shaft being tubular and opening into the one of said crank arms secured thereto, a control shaft extending entirely through said first center shaft and having one end disposed within said one crank arm, a grooved plate secured to said control shaft one end and disposed within said one crank arm, an offset leg secured to said second axle, a follower on said leg for rotating said second axle in response to rotation of said grooved plate relative to said one crank arm, and means connected to the opposite end of said control shaft for rotating said control shaft relative to said first center shaft during the rotation of the crankshaft.

References Cited in the file of this patent

UNITED STATES PATENTS

| 1,769,614 | Anglada | July 1, 1930 |
| 1,964,096 | Tucker | June 26, 1934 |
| 2,209,012 | Barkeij | July 23, 1940 |
| 2,242,715 | Woodford et al. | May 20, 1941 |
| 2,791,122 | Momberg | May 7, 1957 |
| 2,815,681 | Williams | Dec. 10, 1957 |
| 2,856,781 | Forbes | Oct. 21, 1958 |